United States Patent [19]

Tomberlin et al.

[11] Patent Number: 4,775,973
[45] Date of Patent: Oct. 4, 1988

[54] METHOD AND APPARATUS FOR A PACKET-SWITCHED NETWORK COMMUNICATIONS MEASUREMENT MATRIX DISPLAY

[75] Inventors: Jeffrey Tomberlin; Justin S. Morrill, Jr.; James P. Quan, all of Colorado Springs, Colo.

[73] Assignee: Hewlett-Packard Company, Palo Alto, Calif.

[21] Appl. No.: 921,564

[22] Filed: Oct. 22, 1986

[51] Int. Cl.$^4$ .................... H04Q 11/04; H04J 3/24
[52] U.S. Cl. ................................. 370/60; 370/94; 379/136
[58] Field of Search ............... 370/60, 94, 85, 110.1, 370/68.1; 340/825.5; 379/135, 136

[56] References Cited

U.S. PATENT DOCUMENTS

| | | | |
|---|---|---|---|
| 3,721,769 | 3/1973 | Krock et al. | 379/136 |
| 4,072,825 | 2/1978 | McLay et al. | 379/136 |
| 4,139,903 | 2/1979 | Morrill | 364/900 |
| 4,250,354 | 2/1981 | Karras | 379/136 |

OTHER PUBLICATIONS

Jensen, et al., "A Protocol Analyzer for Local Area Networks", Hewlett-Packard Journal, vol. 37, No. 7, Jul. 1986, pp. 42–48.
Shoch, John F.; Hupp, Jon A., "Measured Performance of an Ethernet Local Area Network", Communications of the Association for Computing Machinery (ACM), vol. 23, No. 12, Dec. 1980, pp. 711–727.
Hewlett-Packard Co., Colo. Telecom. Div., "HP 4971A Protocol Analyzer Hardware Support Manual", Feb. 1986.

Primary Examiner—Douglas W. Olms
Assistant Examiner—Frank M. Scutch, III
Attorney, Agent, or Firm—Christopher J. Byrne

[57] ABSTRACT

Disclosed is a communications measurement matrix display for a protocol analyzer which is used to monitor traffic on a packet-switched network. The display allows the protocol analyser user to see, at a glance, a complete and accurate overview of communications between more than thirty-one nodes on a packet-switched network, over a user selectable range of measurement-time intervals. The matrix display has two modes. One mode shows the source versus the destination nodes of the network as a 32-×-32 two-dimensional X-Y grid matrix having thirty one source nodes ordinally indicated along one grid axis and thirty one destination nodes ordinally indicated along the other grid axis. The thirty second ordinal position on each axis designates any nodes other than the first thirty one nodes. A display marker postioned on the grid indicates communication between the source node and the destination node which correspond to the (X,Y), that is, the (SOURCE, DESTINATION), coordinates of the marker. In a second mode, the display shows the node connections only: the display is simply a 32-×-32 two-dimensional X-Y grid having thirty two nodes ordinally indicated on each axis without direction, such as source or destination, indicated. The display of the second mode is essentially the display of the first mode folded onto itself. The matrix display, in both modes, is particularly well suited to the IEEE 802.3 Local Area Network packet-switched network. The matrix display is accomplished usng a combination of dedicated hardware and real-time software.

10 Claims, 10 Drawing Sheets

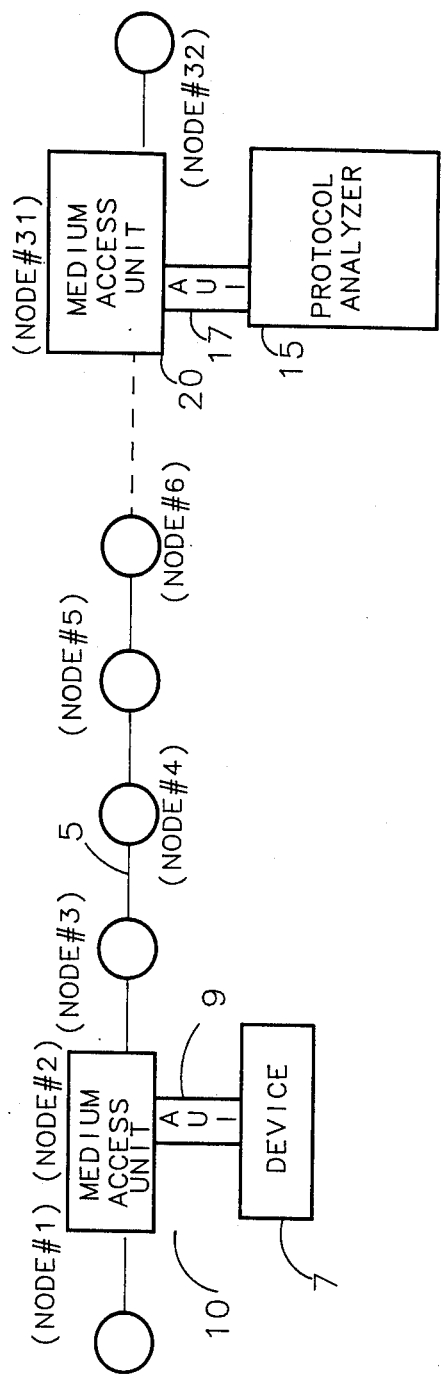

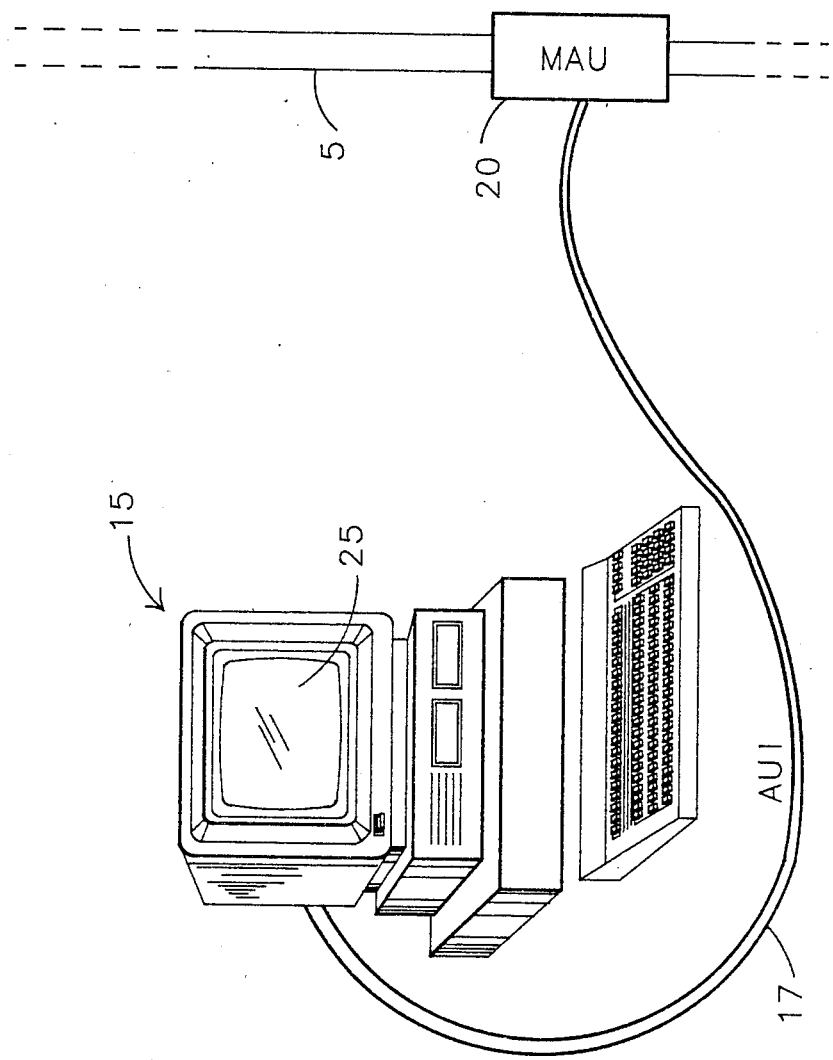

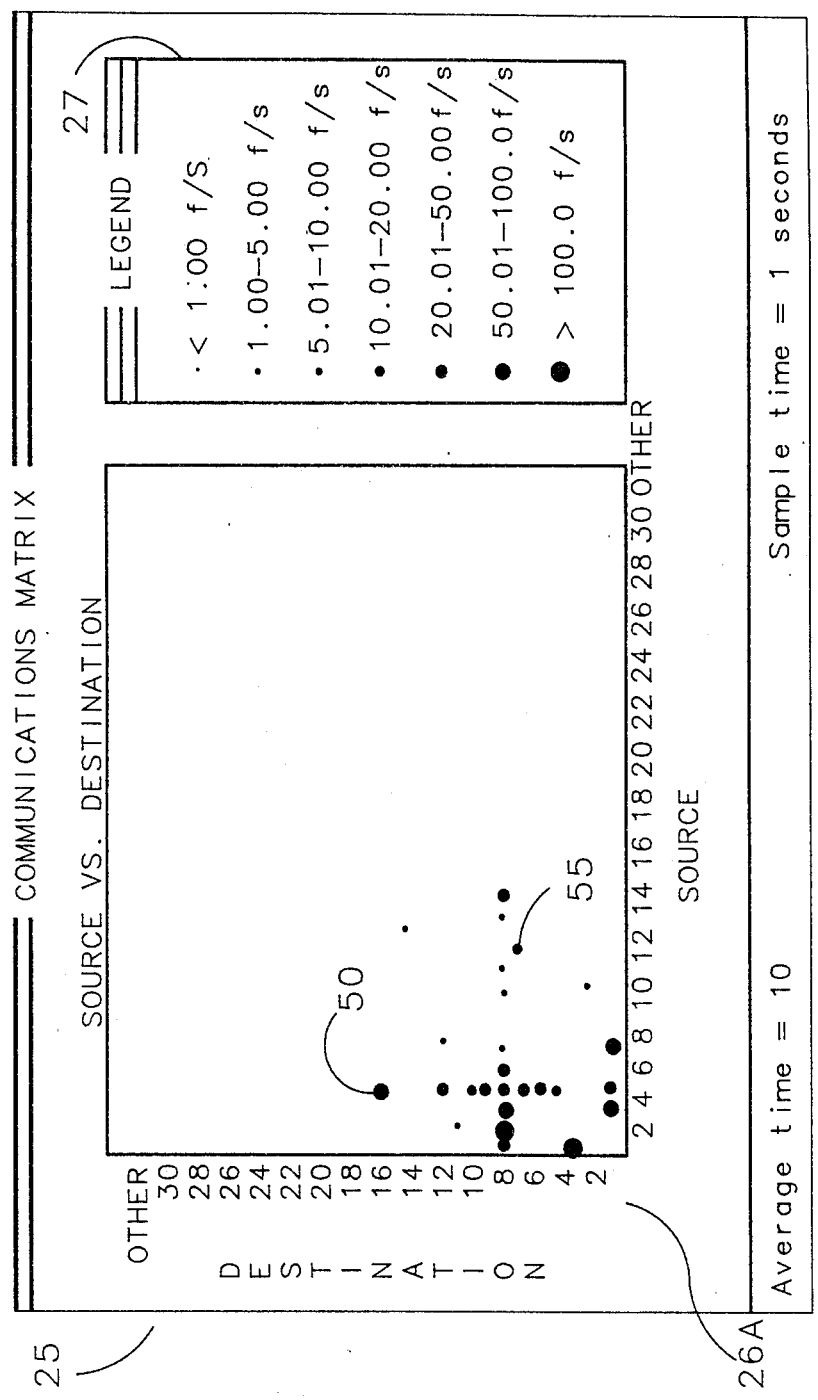

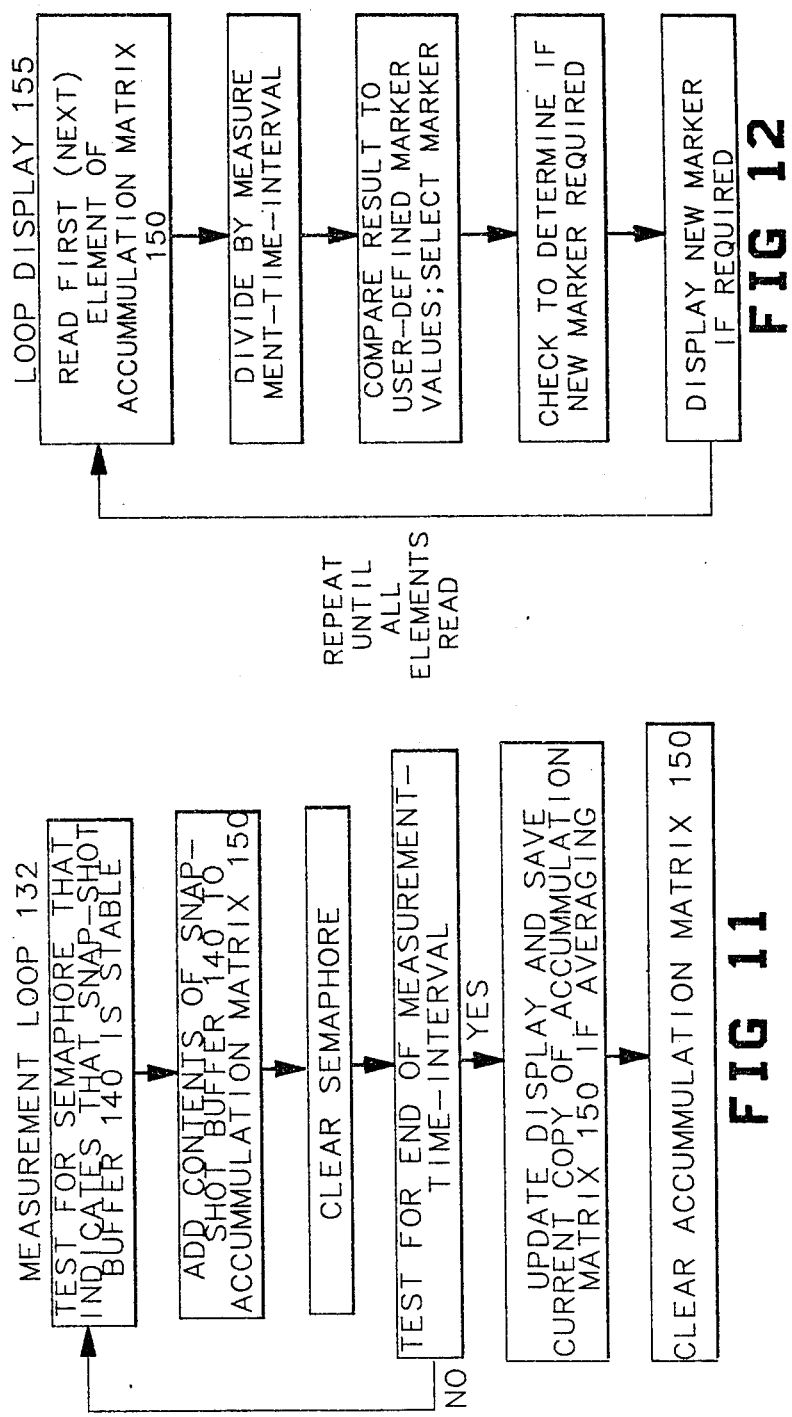

METHOD AND APPARATUS FOR A PACKET-SWITCHED NETWORK COMMUNICATIONS MEASUREMENT MATRIX DISPLAY

BACKGROUND OF THE INVENTION

A packet-switched network is a digital tele-communications scheme that provides interconnection of a variety of data communications devices. Geographically, these devices can be widely separated or quite close. For instance, a wide area packet-switched network (WAN) may span the world; a regional area network (RAN) may cover an entire state; and a metropolitan area network (MAN) may cover a large city. Finally, a local area network (LAN) may cover a more limited area such as a college campus or an office building. Various devices such as computers, terminals, printers, and so on, can be "plugged into" a network at specific network locations known as nodes. Each node on the network is assigned a unique address so that messages between devices at different nodes can be properly transmitted and received over the network.

Messages between devices on a packet-switched network consist of discrete packets of digital information. In order for the network to operate efficiently, such packets must conform to strict network protocol regarding transmission and format of the information packet. For instance, a well-known and commercially accepted LAN standard is encompassed by the Institute of Electrical and Electronic Engineers (IEEE) standard 802.3. The IEEE 802.3 standard features a Carrier Sense Multiple Access with Collision Detection (CSMA/CD) media access system whereby two or more nodes, that is communication devices, share a common bus transmission medium, such as a coaxial cable. To transmit over the LAN, a device at a node waits for a quiet period on the bus, that is, no other node is transmitting. The transmitting device then sends its message packet in bit-serial form at rates up to 10 Mbits/sec. The 802.3 LAN message packet is known as a "frame" and its format is highly standardized.

Obviously, management of a packet-switched network is a complicated task. For instance, modern 802.3 LAN systems can commonly accommodate numerous nodes and tolerate data traffic capacities as high as 15K frames/seconds. Hence, monitoring and management of 802.3 LAN data traffic is crucial. WAN, RAN and MAN systems may pose even larger challenges, but the general management problem is well illustrated by focusing on 802.3 LANs. Efficient management of the 802.3 LAN requires a high-level view of the network as a whole, analogous to using aerial views of metropolitan auto traffic to spot areas of congestion. A high-level view of the network would allow immediate determination of which nodes generate or receive the most traffic, which nodes are busiest at any given time, what device is at any given node, unusual or unexpected network activity, and so on. Such an "aerial" view is useful for quick detection and diagnosis of network activity.

Currently, some LAN devices provide node statistics which give tabular results summarizing activity at the nodes where the devices are located. Such devices may identify overloaded nodes but they cannot give internode information. Moreover, the data provided by such devices may be unintelligible to individuals without familiarity or, perhaps, expertise with the device. Internode information can be provided by protocol analyzers which sample LAN traffic overall to provide tabular statistics regarding the volume of node transmissions and receptions. However, such analyzers may fail to provide node-connection information and their results may be incomplete because important data may be missed in the sampling process. These devices may also require special expertise. Finally, node-connection information has been provided by a path detection software package implemented by Xerox corporation for experimental network monitoring, as described in "Measured Performance of an Ethernet Local Network", *Communications Of The ACM*, Dec. 1980, Vol 23, #12. This package shows whether or not a communication occurred between nodes during the measurement interval. However, it fails to indicate the volume of traffic for a given node connection. Also, it too is based on a sampling technique so that some data may be missed in the sampling process.

SUMMARY OF THE INVENTION

The present invention advances the art of packet-switched network monitoring, maintenance and management with a communications measurement matrix display for a protocol analyzer. The display allows the protocol analyzer user to see, at a glance, a high-level "aerial" view of communications between virtually any number of nodes on a packet-switched network. The preferred embodiment of the present invention is particularly well suited for 802.3 LAN systems for reasons of commercial acceptability, but its salient features are designed for packet-switched networks generally. In one application of the present invention, known as the SOURCE vs. DESTINATION communications matrix, the high-level display is a 32-×-32 two-dimensional X-Y grid matrix having thirty-one "source" nodes ordinally indicated along one grid axis and thirty-one "destination" nodes ordinally indicated along the other grid axis. The thirty-second ordinal position on each axis designates any node other than the first thirty-one nodes. A display marker positioned on the grid indicates communication between the source node and the destination node which correspond to the (X,Y), that is, the (SOURCE,DESTINATION), coordinates of the marker.

In a second application of the present invention, known as the NODE CONNECTIONS TOTALS communications matrix, the display is simply a 32-×-32 two-dimensional X-Y grid matrix having thirty-two nodes ordinally indicated on each axis. The NODE CONNECTIONS TOTALS communications matrix is essentially the SOURCE vs. DESTINATION matrix folded along its diagonal such that the display markers indicate simply the magnitude of traffic between a given node and every other node, without indicating direction of traffic as between a source and a destination.

In both applications, a legend set of easily distinguishable display markers is used to distinguish different volumes of traffic between nodes. Moreover, the legend is adjustable so that the traffic volume associated with each marker can be set by the user. The display is also available in color, further enhancing legend marker distinguishability.

The present invention can also display the results of continuous network monitoring over a user-selectable range of measurement-time-intervals ranging from one second up to four hours. A "running average" display for as many as ten measurement-time-intervals is also available such that the network may be continuously display-monitored for as long as forty hours.

Finally, unlike statistical sampling systems which may miss data in the sampling process, the present invention is based on dedicated hardware which detects and "reads" all network traffic without interfering with such traffic. Although the present invention could be sampling-based, a dedicated hardware implementation was chosen so that the user can be sure that the display completely reflects all network activity, some of which could otherwise be missed in statistical sampling processes.

The present invention measures network communications via a combination of dedicated hardware and real-time software. The hardware consists of a so-called address-trap machine which is programmed with the addresses of the nodes on the network. The address-trap machine catches the source and destination address of each information packet transmitted on the network transmission medium without disrupting packet transmission. The address-trap machine then outputs a sixteen-bit word containing the node numbers matched by the source and destination addresses of each packet. A fast execution software loop collects the counts for each of the nodes and puts the results into a 32-×-32 array. Higher level software accumulates the array values for the duration of the user-selected measurement-time-interval and quantifies each count based on the user-selected legend setting. The appropriate marker is then presented on the grid matrix display.

Hence, the present invention allows the protocol analyzer user to see, at a glance, a complete and accurate overview of communications between more than thirty-one nodes on a packet-switched network, over a user-selectable range of measurement-time-intervals. The display simultaneously identifies the most heavily loaded and heavily loading nodes and makes readily visible unusual or unexpected network activity. The display provides a unique "aerial" view of the network allowing for quick understanding and diagnosis of activity anywhere on the network.

BRIEF DESCRIPTION OF THE DRAWINGS

FIG. 1 shows a schematic overview of a Local Area Packet-Switched Network (LAN).

FIG. 2 shows a schematic block diagram of an 802.3 LAN packet, known as a frame.

FIG. 3 shows a general overview of a protocol analyzer interfacing with a LAN transmission medium bus.

FIG. 4A shows a sample SOURCE vs. DESTINATION communications matrix display constituting one application of the present invention.

FIG. 11 shows a functional diagram of MEASUREMENT LOOP 132 of FIG. 5.

FIG. 12 shows a functional diagram of DISPLAY LOOP 155 of FIG. 5.

DESCRIPTION OF THE PREFERRED EMBODIMENT OF THE PRESENT INVENTION

Figure 4B:
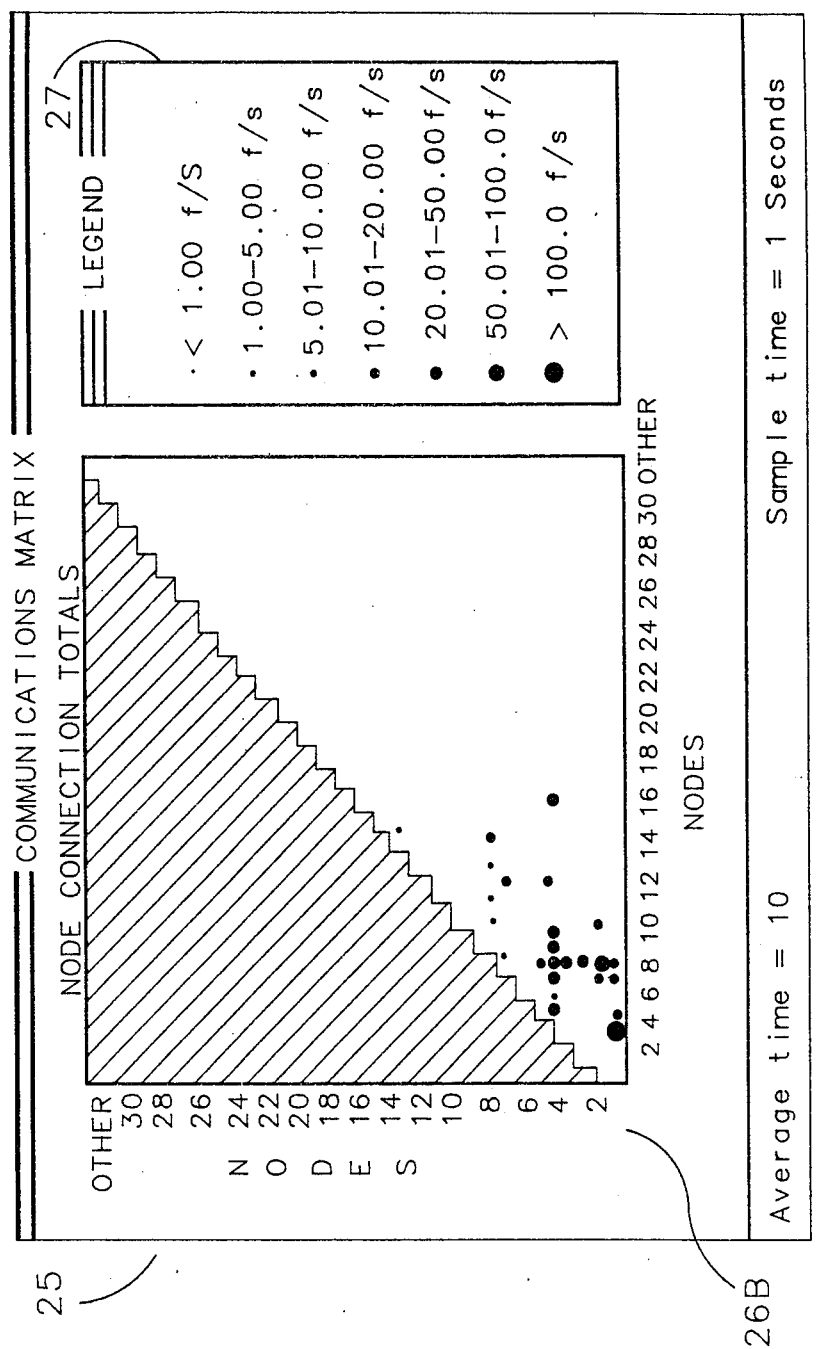
FIG. 4B shows a sample NODE CONNECTIONS TOTALS communications matrix display constituting a second application of the present invention.

FIG. 1 shows a schematic overview of an 802.3 local area network (LAN) having thirty-two nodes, which is shown to illustrate the general nature of a packet-switched network. At each node, a device can be connected to the network. Such a device may be a terminal, a printer, a computer, and so on. The nodes are interconnected to each other by transmission bus 5 which is typically a coaxial cable. Devices at different nodes interface with bus 5 via a standardized transmission medium access unit (MAU) and attachment unit interface cable (AUI). Devices then communicate with each other through transmission and reception of discrete packets of digital information on bus 5. Each discrete information packet is known as a LAN frame. Device 7 at node-two interfaces with LAN bus 5 via AUI 9 and MAU 10. Also shown is protocol analyzer 15, such as would be used with the present invention. Protocol analyzser 15 "eavesdrops" on the LAN at node-thirty-one via AUI 17 and MAU 20. Protocol analyzer 15 is used to monitor, without interrupting, frame traffic on the LAN.

FIG. 2 shows a schematic overview of an 802.3 LAN frame, which is shown to illustrate the general nature of a packet-switched network information packet. The 802.3 LAN frame is a standardized discrete packet of digital information. Devices on a 802.3 LAN communicate with each other through the transmission and reception of such frames. Examining the frame from head to tail, the 802.3 LAN frame consists of an 8-byte preamble; a 6-byte destination address which uniquely identifies the node to which the frame is being sent; a 6-byte source address which uniquely identifies the node from which the frame originated; a 2-byte data-type field which indicates the type of data which the frame contains; a data field that may be from 46 to 1500 bytes long; followed by a 4-byte frame check sequence.

FIG. 3 shows a general overview of protocol analyzer 15 of FIG. 2, interfacing with LAN bus 5 via AUI 17 and MAU 20. The results of monitoring and analysis of frame traffic on LAN bus 5 are displayed on display screen 25.

FIG. 4A is a sample of one application of the present invention known as the SOURCE vs. DESTINATION communications matrix display, indicated by reference numeral 26A. As can be seen, display 26A consists of a 32-×-32 two-dimensional grid matrix having thirty-one source nodes ordinally indicated along the horizontal axis and thirty-one destination nodes ordinally indicated along the vertical axis. The thirty-second ordinal position on each axis designates any node other than the first thirty-one nodes. A display marker positioned on the grid indicates network communication between the source node and the destination node which correspond to the (SOURCE, DESTINATION) coordinates of the marker. In FIG. 4A, two such markers are indicated by reference numerals 50 and 55. To the right of the matrix is traffic volume legend 27 having different, easily distinguishable, display markers associated with different volumes of network communication traffic. Legend 27 is adjustable so that the user may select the traffic volume associated with each marker. Such network traffic volume is measured in units of frames/(measurement-time-interval). The measurement-time-interval is user-selectable over a range of one second to four hours. The measurement-time-interval is displayed on the screen as the sample time, as shown in FIG. 4A. In FIG. 4A the sample time is one second so that network traffic volume is measured in units of frames/second. Hence, display marker 50 indicates that between twenty and fifty frames/second are being sent from node-four to node-sixteen while display marker 55 indicates that between five and ten frames/second are being sent from node-twelve to node-seven. The remaining display markers in FIG. 4A represent similar information. Another feature of the present invention is the average time. The average time is an integral multiple, from one to ten, of the sample time. The average time in FIG. 4A is shown as ten sample times. The average time defines how often the display is updated. Hence, in FIG. 4A the display 26A would be updated once a second for ten seconds, in "running average" fashion. The running average works as follows: suppose the user selects a sample-time, that is, a measurement-time-interval, of one second and an average time of ten. After one second the frame counts for each matrix grid position are each divided by the sample-time and the appropriate markers from legend 27 are displayed at the appropriate grid positions. After two seconds, the frame counts of the first sample-time interval are added to the corresponding frame counts of the second sample-time interval, the resultant sum is divided by two seconds and the appropriate legend 27 markers are displayed in the appropriate grid positions. After three seconds, the frame counts for the first two sample-time intervals are added to the corresponding frame counts of the third sample-time interval, the sum of all three sample-time intervals are divided by three seconds, and the appropriate legend 27 markers are displayed in the appropriate grid positions. This process continues until the counts of ten sample-time intervals are added, the resultant sum divided by ten sample-times, that is, ten seconds, and the legend 27 markers displayed. Moreover, the running average is continuous. That is, the running average window moves forward in time so that the most recent sample-time interval is always included. For instance, suppose that the sample-time is one second and the average time is five. After five seconds, the frame counts of sample-time intervals #1 through #5 would be added and their sum divided by five seconds and the legend 27 markers displayed. After six seconds, the frame counts from sample-time intervals #2 through #6 would be added, etc. After seven seconds, the frame counts from sample-time intervals #3 through #7 would be added, etc. The end result of the running average feature is a continuous display that can change as network traffic volume changes. Finally, the high-level "aerial" perspective of the network provided by the present invention is also evident from FIG. 4A. For instance, a mere glance is required to realize that node-four is a busy source node while node-eight is a busy destination node. If a network manager suspected a faulty transmitter somewhere on the network, such "aerial" information helps to quickly diagnose its location, particularly if node-four busier than expected, for example.

FIG. 4B is a sample of a second application of the present invention known as the NODE CONNECTIONS TOTALS communications matrix display, indicated by reference numeral 26B. NODE CONNECTIONS TOTALS display 26B is essentially SOURCE vs DESTINATION display 26A folded along its diagonal such that the display markers indicate simply the magnitude of traffic between a given node and every other node, without indicating the direction of traffic, such as between a source and a destination. The folding of the SOURCE vs. DESTINATION display to produce the NODE CONNECTIONS TOTALS display is more fully discussed in connectiion with FIGS. 9A, 9B and 9C.

Figure 5:
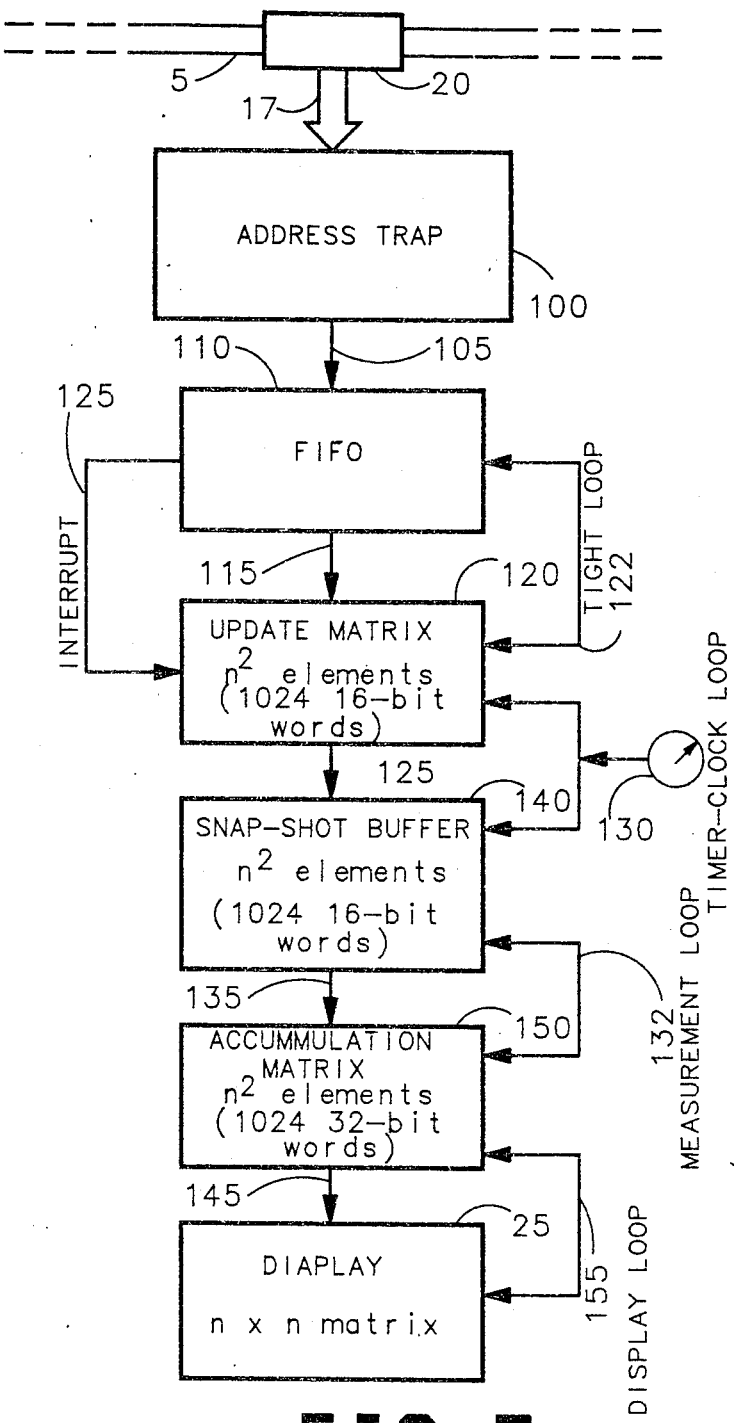
FIG. 5 shows a schematic block diagram of the present invention.

FIG. 5 shows a schematic overview of the hardware used to implement the displays of FIG. 4A and 4B. As frame traffic travels between LAN nodes on LAN bus 5, the destination and source address of each frame is captured by ADDRESS-TRAP 100 via MAU 20 and AUI 17. (Such capture does not interfere with normal frame traffic on bus 5.) The ADDRESS TRAP 100 is programmed with the addresses of the thirty-one nodes on the LAN. For each frame, ADDRESS-TRAP 100 outputs a sixteen-bit word on bus 105. The least significant five bits of each sixteen-bit word represent a number between zero and thirty-one which corresponds to the node number of the source address. The next most significant five bits of each sixteen-bit word represent a number between zero and thirty-one which corresponds to the node number of the destination address. The remaining six bits are set to zero. These zero bits prove to be useful for bit shifting purposes as explained below. Hence, for each frame traveling on LAN bus 5, ADDRESS-TRAP 100 outputs a sixteen-bit word having the configuration: 000000DDDDDSSSSS, where 0 represents the zero field, D represents the destination address field and S represents the source address field. The sixteen-bit word outputs of ADDRESS-TRAP 100 are temporarily stored in First-In-First-Out (FIFO) buffer 110. (ADDRESS-TRAP 100 and FIFO 110, together with AUI 17 and MAU 20, are known in the prior art as an LAN receiver board and shallow trap machine which are included in the Hewlett-Packard 4971A Protocol Analyser and described in the 4971A Hardware Support Manual, part #04971-90005, and available to the public as such.) In the preferred embodiment of the present invention, FIFO 110 has a capacity to hold 512 sixteen-bit words. When FIFO 110 is half full, it generates INTERRUPT 125, at which time the contents of FIFO 110 are transferred via bus 115 to UPDATE MATRIX 120. UPDATE MATRIX 120 represents a real-time digital version of the matrix display. UPDATE MATRIX 120 contains 32-×-32=1024 elements where each element is a sixteen-bit word. Each element of UPDATE MATRIX 120 is essentially a sixteen-bit counter corresponding to one of the 32-×-32=1024 grid positions of the matrix display 26A of FIG. 4A. UPDATE MATRIX 120 is implemented with 1024 consecutive sixteen-bit words of memory. A given counter-element in UPDATE MATRIX 120 is incremented when a word from FIFO 110 is received containing the destination and source fields which correspond to that element in the matrix. The correspondence between words in FIFO 110 and counter-elements in UPDATE MATRIX 120 is governed by TIGHT LOOP 122. Each second, TIMER-CLOCK LOOP 130 triggers UPDATE MATRIX 120 and SNAP-SHOT BUFFER 140 and the contents of UPDATE MATRIX 120 are transferred to SNAP-SHOT BUFFER 140 via bus 125 and UPDATE MATRIX 120 is cleared. SNAP-SHOT BUFFER 140 is appropriately named because it essentially contains a second-by-second "snap-shot" copy of the contents of UPDATE MATRIX 120. SNAP-SHOT BUFFER 140 is also implemented with 1024 consecutive sixteen-bit words in memory. Note that the interval of TIMER-CLOCK LOOP 130 is equal to the smallest measurement-time-interval, that is, one second. This is so that UPDATE MATRIX 120 is cleared and ready for new data at least as often as the time-length of the shortest measurement-time-interval. MEASUREMENT LOOP 132 controls the transfer and accummulation of successive snapshots from SNAP-SHOT BUFFER 140 to ACCUMMULATION MATRIX 150 for the duration of the user-selected measurement-time-interval. Like UPDATE MATRIX 120, ACCUMMULATION MATRIX 150 also has $32 \times 32 = 1024$ counter-elements but each counter-element of ACCUMMULATION MATRIX 150 is a thirty-two-bit word. ACCUMMULATION MATRIX 150 requires larger sized counter-elements because it records the accummulated frame counts of each element of UPDATE MATRIX 120 over the entire user-defined measurement-time-interval, which may be as long as four hours. Each of the $32 \times 32 = 1024$ counter-elements of ACCUMMULATION MATRIX 150 corresponds to one of the $32 \times 32 = 1024$ matrix grid positions of matrix display 26A of FIG. 4A, in a memory mapping fashion. Each counter-element of ACCUMMULATION MATRIX 150, therefore, contains the frame count value for a corresponding grid position of matrix display 26A for the given user-selected measurement-time-interval. ACCUMMULATION MATRIX 150 is implemented with 1024 consecutive thirty-two-bit words in memory. DISPLAY LOOP 155 governs the interaction of ACCUMMULATION MATRIX 150 and DISPLAY 25. DISPLAY LOOP 155 reads the count values of each counter element of ACCUMMULATION MATRIX 150 for the user-selected measurement-time-interval and then positions the appropriate legend 27 display markers at the appropriate positions on DISPLAY 25.

Figure 6:
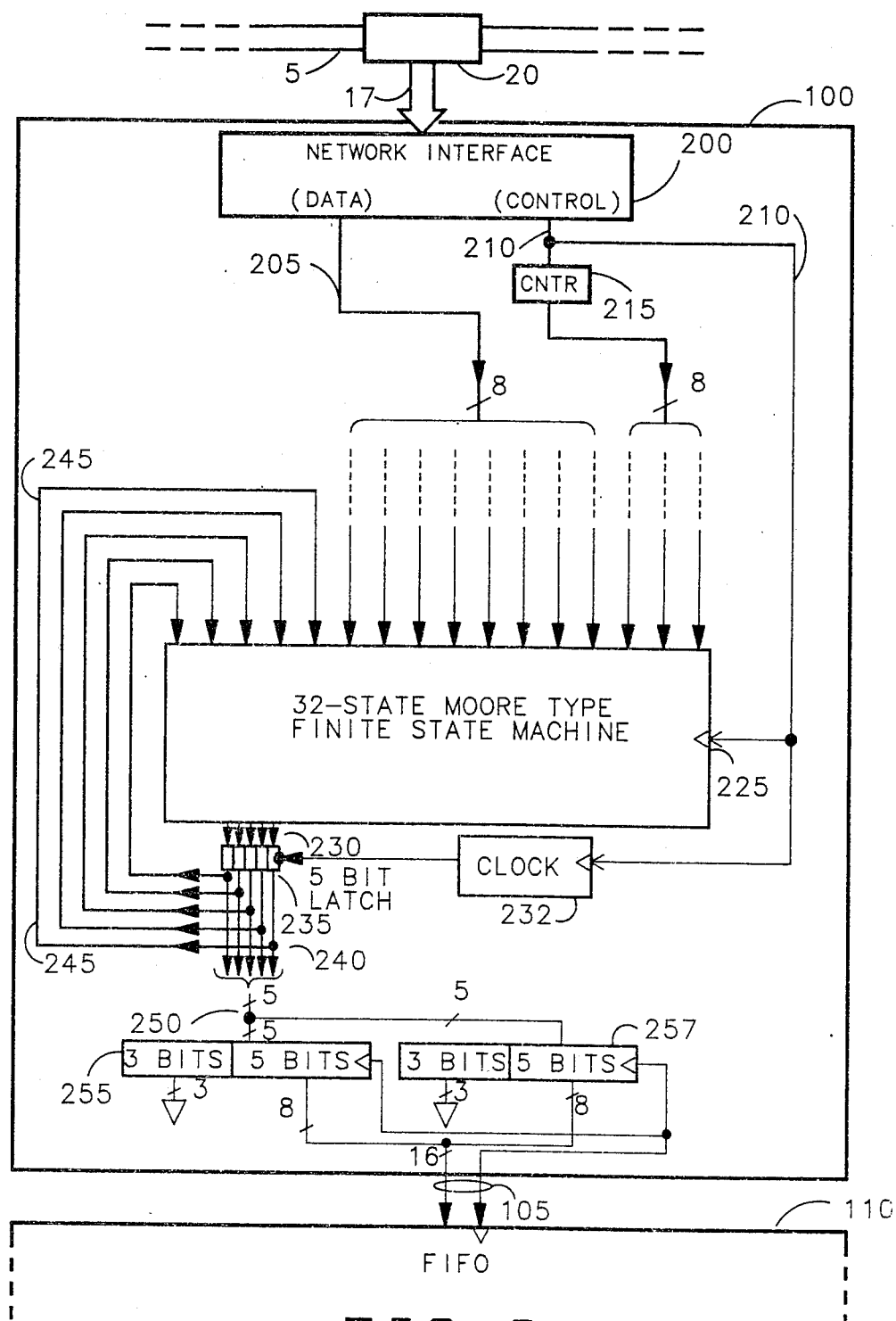
FIG. 6 shows a schematic diagram of ADDRESS TRAP 100 of FIG. 5.

FIG. 6 shows a schematic diagram of ADDRESS TRAP 100 of FIG. 5. Network packet traffic is "captured" by ADDRESS TRAP 100, without interferring with such traffic, via MAU 20 and AUI 17. Network interface board 200 processes the frames. In the preferred embodiment of the present invention, such processing is performed with the Intel Corporation 82586 LAN coprocessor which is specifically designed for the 802.3 LAN, among other things. LAN frames are input into network interface 200 in serial format and converted to parallel digital data as output. Such data is output over byte bus 205. In addition, network interface 200 issues control signals via control line 210. In the preferred embodiment of the present invention, the destination and source address fields of each LAN frame are transmitted, one byte at a time, over byte bus 205 to the eight data inputs of state machine 225. In the preferred embodiment of the present invention, state machine 225 has sixteen inputs, indicated by reference numeral 220. Inputs #3 through #10 are data inputs which receive the address bytes transmitted by network interface 200 over byte bus 205. In response to control signals from network interface 200 via control line 210, counter 215 counts the six bytes of the destination field of a given LAN frame and then resets and counts the six bytes of the source field of that frame. Inputs #0 through #2 of inputs 200 of state machine 225 receive the counts of counter 215. The counts of counter 215 inform state machine 225 when the complete destination and source fields of each frame have been received so that state machine 225 "knows" whether it just received a destination address or a source address. State machine 225 is a thirty-two state Moore-type finite state machine. The output of such a state machine depends only on its present state. In the preferred embodiment of the present invention, state machine 225 is implemented with random access memory so that its states are programmable. Essentially, the thirty-two states of state machine 225 are the thirty-two possible network locations of display 26A(B) of FIG. 4A(B). State machine 225 will assume one of thirty-two possible states for each source or destinatiion address field of an LAN frame that it receives as input. State machine 225 converts each six-byte address it receives, whether it is a source address or a destination address, into a five-bit number between zero and thirty-one, which number will be identical to its present state. This present state information is output as a five-bit number over output lines 230. The five-bit present state number matches the node number of a given frame's source or destination address field. The five-bit present state number is latched into five-bit latch 235 in response to control signals from network interface 200 to state machine 225. Network interface 200 control signals also trigger clock 232 which triggers five-bit latch 235 to output its five-bit present state number over output lines 240. The same present state number is also fed back to inputs #11 through #15 of state machine 225 via feedback lines 240. Thus, given its present state as feedback input, state machine 225 will transition to a programmed next state upon receiving the six-byte source or destination field of the next frame trapped. Additional control signals from network interface 200 latch the five-bit present state number from five-bit latch 235 into either eight-bit latch 255 or eight-bit latch 257 via output lines 240. The most significant three bits of both eight-bit latch 255 and eight-bit latch 257 are tied to ground so they always contain zeroes. The remaining five bits of each eight-bit latch will contain a five-bit present state number from five-bit latch 235. Control signals from network interface 200 send the five-bit present state numbers corresponding to source addresses into eight-bit latch 257 while the present state numbers corresponding to destination addresses are sent to eight-bit latch 255. Both eight-bit latches are then triggered by interface network 200 control signals such that they produce a single sixteen bit word which is written to FIFO 110 via bus 105. Each such sixteen-bit word corresponds to a single LAN frame and has source node information in its least signifcant five bits, destination node information in its next most significant five bits and zeroes in the remaining six bits.

Figure 7:
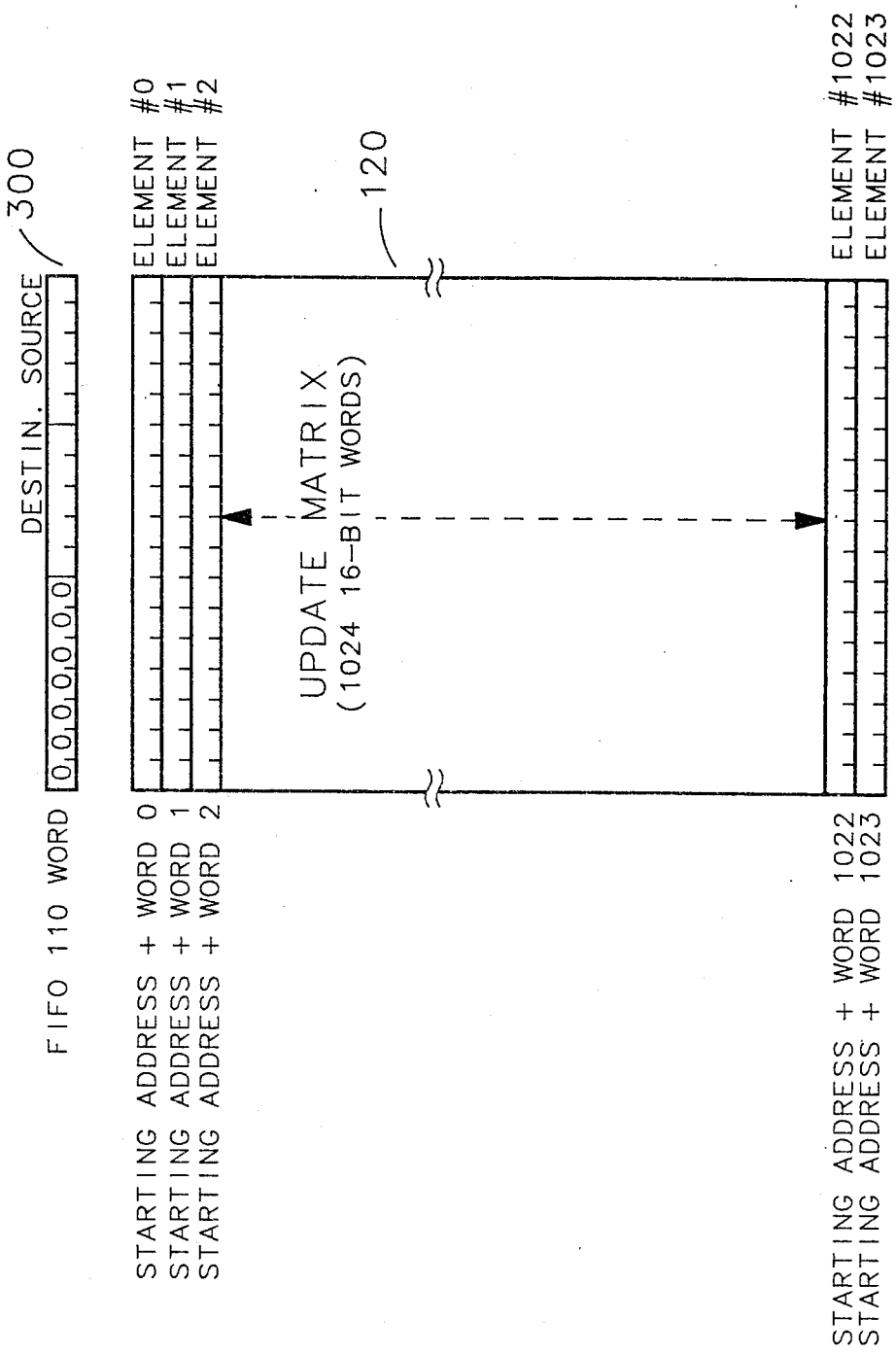
FIG. 7 shows the relationship between a FIFO 110 word and UPDATE MATRIX 120 of FIG. 5.

FIG. 7 shows the correspondence between a FIFO 110 word and the elements of UPDATE MATRIX 120. In the preferred embodiment of the present invention, each word of FIFO 110, such as word 300, is associated with a single LAN frame. Word 300 is representative of FIFO 110 words, which are received as output from ADDRESS-TRAP 100 of FIG. 5. Word 300 is a sixteen-bit word. The least significant five bits of word 300 constitute a source address field which holds a number, zero through thirty-one, since five bits allow for $2^5 = 32$ possible combinations, which number represents the source node of a given frame. A zero indicates that none of the thirty-one nodes was matched. The next most significant five bits of word 300 constitute a destination address field which holds a number, zero through thirty-one representing the destination node of that frame. Again, a zero indicates that none of the thirty-one nodes was matched. The remaining most significant six bits are always zero. Hence, the least significant ten bits of word 300 account for $2^5 \cdot \times \cdot 2^5 = 2^{10} = 1024$ possible source-X-destination node combinations. Each such combination is associated with one of the 32-×-32=1024 grid positions of display 26A of FIG. 4A. For each such grid position, there is a counter element in UPDATE MATRIX 120. UPDATE MATRIX 120 therefore has 1024 counter elements, each of which is a sixteen-bit word. Hence, the least significant ten bits of each FIFO 110 word, such as word 300, serve as a convenient index to the proper location in UPDATE MATRIX 120 of the counter element which corresponds to that word's particular source-X-destination combination. Hence, given the starting address in memory of 1024 consecutive words, that is, UPDATE MATRIX 120, the least significant ten bits of a FIFO 110 word, such as word 300, will serve as an offset from that starting address of the proper counter-element in UPDATE MATRIX 120. Each time a counter element is accessed by a FIFO 110 word, the element is incremented, as explained below.

Figure 8:
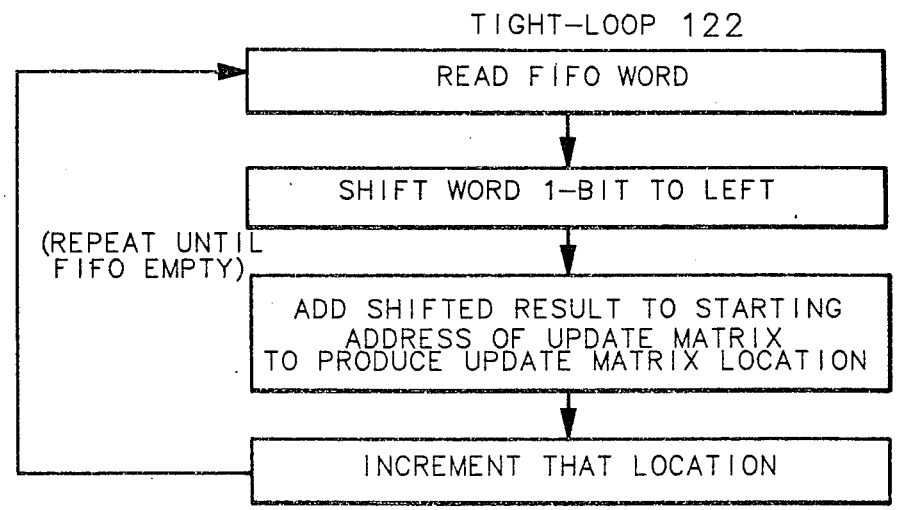
FIG. 8 shows a functional diagram of TIGHT LOOP 122 of FIG. 5.

FIG. 8 is a functional diagram of TIGHT LOOP 122 of FIG. 5. TIGHT LOOP 122 first reads a single word from FIFO 110. It then shifts that word one bit to the left. Left-shifting simply doubles the number represented by the FIFO word. This doubling is necessary in the preferred embodiment of the present invention as explained below. The shifted result is then added to the starting address of UPDATE MATRIX 120. In the preferred embodiment of the present invention, addressing of UPDATE MATRIX 120 is performed with a microprocessor which addresses even-numbered bytes in memory. Hence, simply left-shifting the FIFO 110 word one bit provides an even number which still preserves the proper offset to the starting address in memory of UPDATE MATRIX 120. This offset is the location in UPDATE MATRIX 120 of the counter-element corresponding to the given FIFO 110 word. The counter-element at that location is then incremented. TIGHT LOOP 122 repeats until FIFO 110 is empty.

Figure 9B:
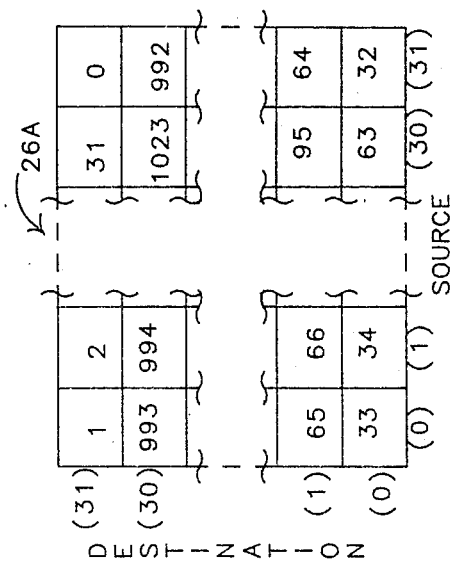
FIGS 9A, 9B and 9C show the relationship between the 1024 counter-elements of UPDATE MATRIX 120 and the 1024 grid positions of matrix display 26A(B) of FIG. 4A(B).
Figure 9C:
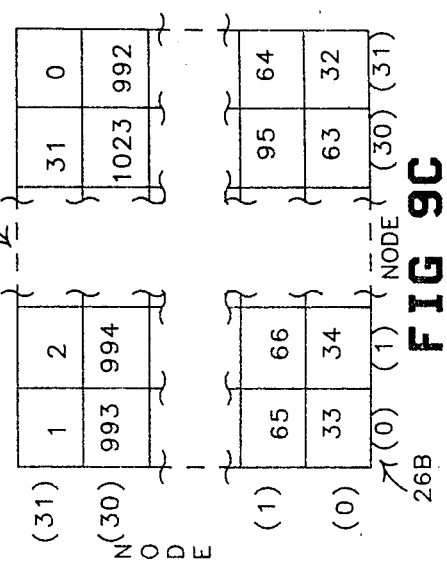
Figure 9A:
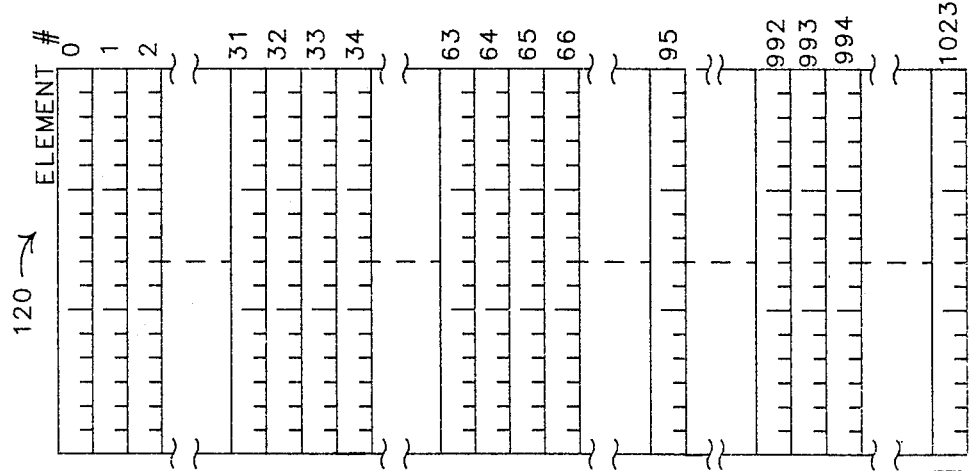

FIGS. 9A, 9B and 9C show the relationship between the 1024 counter-elements of UPDATE MATRIX 120 and the 32-×-32=1024 grid positions of matrix display 26A(B) of FIG. 4A(B). In the preferred embodiment of the present invention, display 25 is implemented with a raster display and the pixel density of display 26A(B) is 256 pixels wide by 244 pixel high. Since display 26A(B) has 32-×-32=1024 grid positions, such as grid position #32 in the lower-right-hand corner, each grid position is 256/32=8 pixels wide and 244/32=7 pixels high. That is, each grid position consists of a 7-×-8=56 pixel rectangle. Each such pixel rectangle can accommodate a single legend 27 marker. This relatively large number of pixels accommodates the range of legend 27 markers, from the smallest marker to the largest marker. The 1024 counter-elements of UPDATE MATRIX 120 are essentially 1024 consecutive sixteen-bit words in memory. The elements are consecutively labelled at the right of UPDATE MATRIX 120 in FIG. 9A. Although numerous memory mapping schemes are possible, the scheme employed in the preferred embodiment of the present invention is as follows. The element #0 of UPDATE MATRIX 120 is mapped onto the upper-right-hand most grid position of display 26A(B). Element #1 is mapped onto the upper-left-hand-most grid position. Elements #2 through #31 then correspond to the remaining thirty grid positions in the top row from left to right. Element #32 of UPDATE MATRIX 120 is mapped onto the the lower-right-hand-most grid position of display 26A(B). Element #33 is mapped onto the lower-left-hand-most grid position. Elements #34 through #63 then correspond to the remaining thirty grid positions in the bottom row from left to right. The remaining thirty rows of grid positions are similarly mapped, working vertically from the bottom row. As an aid to understanding, the numbers of certain elements in UPDATE MATRIX 120 have been written into their corresponding grid positions in display 26A(B) in a manner which illustrates the mapping scheme employed. In producing the NODE CONNECTIONS TOTALS display 26B, such as in FIG. 4B, the "folding over" of SOURCE vs. DESTINATION display 26A is accomplished as follows: each element in memory is added to its mirror image, the resultant sum is divided by the measurement-time-interval, that is, the sample-time, and the result displayed. Hence, the NODE CONNECTIONS TOTALS display is produced in the same way as the SOURCE vs. DESTINATION display except that each element is first added to its mirror image prior to division by the measurement-time-interval. The mirror image of a given element is another element whose destination node value matches the given element's source node value and whose source node value matches the given element's destination node value. For instance, the 1024 elements of UPDATE MATRIX 120 can be addressed with ten-bit offsets. The least significant five bits define the source node value and the next five bits define the destination node value for that element. For example, the mirror image of the element with offset address 1000101110 is the element with offset address 0111010001. The result of mirror imaging is that the portion above the diagonal in FIG. 26B of FIG. 4B is never accessed.

Figure 10:
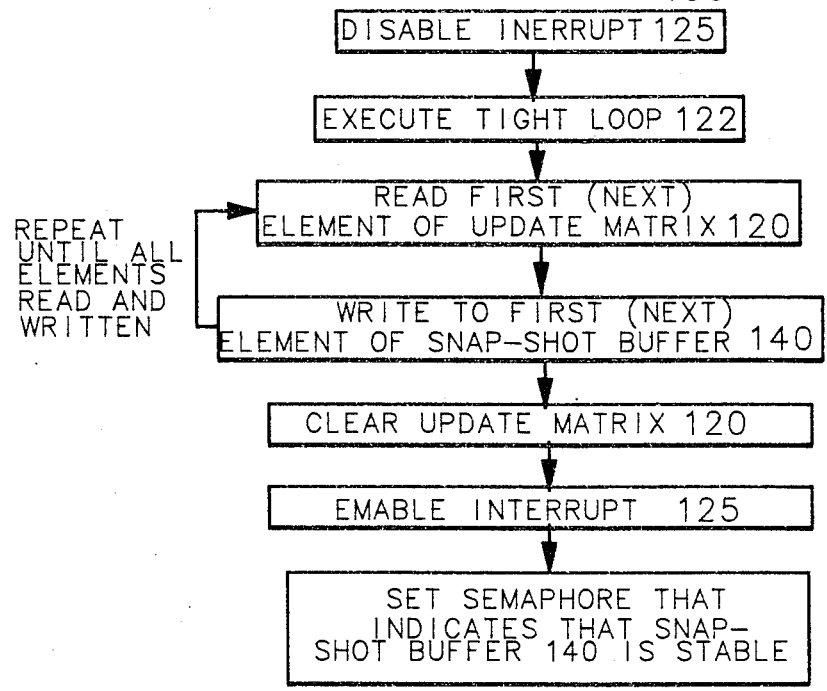
FIG. 10 shows a functional diagram of TIMER-CLOCK LOOP 130 of FIG. 5.

FIG. 10 is a functional diagram of TIMER-CLOCK LOOP 130 of FIG. 5. The first function TIMER-CLOCK LOOP 130 performs is to disable interrupt 125 of FIFO 110. TIGHT LOOP 122 is then invoked to ensure that FIFO 110 is empty. TIMER-CLOCK LOOP 130 then reads the first element of UPDATE MATRIX 120. That element is then written into the first element of SNAP-SHOT BUFFER 140. Then the next element of UPDATE MATRIX 110 is read and written to the next element of SNAP-SHOT BUFFER 140. This routine repeats until all of UPDATE MATRIX 120 is copied into SNAP-SHOT BUFFER 140. UPDATE MATRIX 120 is then cleared. Interrupt 125 is then enabled. It is necessary to first disable interrupt 125 so that no new FIFO 110 words will be written to UPDATE MATRIX 120 while it is being copied into SNAP-SHOT BUFFER 140. After interrupt 125 is enabled, a semaphore bit is set in a status word of SNAP-SHOT BUFFER 140. Setting the semaphore bit indicates that SNAP-SHOT BUFFER 140 is stable, that is, that it contains the most recent copy of UPDATE MATRIX 120, and that the copy can be safely read out of SNAP-SHOT BUFFER 140.

FIG. 11 is functional diagram of MEASUREMENT LOOP 132 of FIG. 5. MEASUREMENT LOOP 132 first tests for the setting of the semaphore bit in the status word of SNAP-SHOT BUFFER 140, indicating that SNAP-SHOT BUFFER 140 can be safely read.

Once the semaphore is set, MEASUREMENT LOOP 132 adds the contents of SNAP-SHOT BUFFER 140 to ACCUMMULATION MATRIX 150. This adding accummulates the frame count values of each element of UPDATE MATRIX 120 in ACCUMMULATION MATRIX 150. (Recall that ACCUMMULATION MATRIX 150 has the same number of elements as UPDATE MATRIX 120 but each element is twice as large so that a higher count value is possible for each element.) MEASUREMENT LOOP 132 then clears the stability semaphore in SNAP-SHOT BUFFER 140. MEASUREMENT LOOP 132 then tests for the end of the user-selected measurement-time-interval. The measurement-time-interval, that is, the sample-time, is the interval of time during which frame counts will be accummulated. If the measurement-time-interval, that is, the sample-time, is not over, the contents of SNAP-SHOT BUFFER 140 are again added to ACCUMMULATION MATRIX 150. At the end of the measurement-time-interval, that is, the sample-time, the display is updated and ACCUMULATION MATRIX 150 is cleared. If time averaging is being employed, the contents of the ACCUMULATION MATRIX 150 are saved in memory prior to clearing. This saving is required to accummulate previous sample-time displays for the duration of the averaging time. When averaging, each previous sample-time copy of ACCUMMULATION MATRIX 150 is copied into a separate chunk of memory. Hence, if, for instance, the average time is ten, then ten separate copies of ACCUMMULATION MATRIX 150 are made, one for each sample-time interval. These copies are averaged in running average fashion as discussed in connection with FIG. 4A.

FIG. 12 is a functional diagram of DISPLAY LOOP 155 of FIG. 5. At the end of the user-selected measurement-time-interval, DISPLAY LOOP 155 reads the first element of ACCUMMULATION MATRIX 150. The elements of ACCUMMULATION MATRIX 150 hold simple count values, that is, numbers. The count values represent the number of times that a frame with a given source-X-destination combination has been trapped. This number is then divided by the user-selected measurement-time-interval to provide a frames/(measurement-time-interval) ratio. This ratio is then compared to the user-defined display-marker values, as shown in legend 27 of FIGS. 4A and 4B. The ratio is used to determine which display-marker is required. A check is then made to see if a new marker is required. This check is made to avoid unnecessary invocation of display routines. If a new display-marker is required, then it is positioned on display screen 25. Screen position is a function of element number as explained in connection with FIGS. 9A, 9B and 9C showing the relationship between UPDATE MATRIX 120 and the SOURCE vs. DESTINATION display 26A. The 1024 elements of ACCUMMULATION MATRIX 150 correspond to the 32-X-32=1024 possible grid positions of display 26A of FIG. 9B in the same way. The only difference is that each element of ACCUMULATION MATRIX 150 is a thirty-two-bit word while each element of UPDATE MATRIX 120 is a sixteen-bit word. The folding over of the SOURCE vs. DESTINATION display to produce the NODE CONNECTIONS TOTALS display is also discussed in connection with FIG. 9C. Mirror imaging of the elements of ACCUMMULATION MATRIX 150 works in the same manner as discussed in connection with the mirror imaging of UPDATE MATRIX 120 in connection with FIGS. 9A, 9B and 9C.

We claim:

1. A packet-switched network traffic measurement apparatus, said packet-switched network having a plurality of nodes, said nodes hosting devices, wherein said devices communicate with each other via said network by means of transmission and reception of packets of information, said packets having source node fields and destination node field, said measurement apparatus comprising:

trap means coupled to said packet-switched network for trapping packets transmitted on said network;

measurement means coupled to said trap means and operative to produce network traffic measurement information;

display means couple to said measurement means to present at least a portion of said measurement information; and wherein said measurement information includes source data regarding the source on the network of network traffic, destination data regarding the destination on the network of network traffic, and volume data regarding the magnitude of said network traffic.

2. A measurement apparatus as recited in claim 1 wherein said display means graphically presents said measurement information.

3. A measurement apparatus as recited in claim 2 wherein said display means includes visual display means for graphically presenting said measurement information.

4. A measurement apparatus as recited in claim 3 wherein said visual display means is configured to display a scatter graph derived from said source data, said destination data and said volume data.

5. A measurement apparatus as recited in claim 4 wherein said scatter graph includes a source axis having a plurality of source indicia and a destination axis having a plurality of destination indicia and wherein traffic activity on said network is indicated by communication indicia.

6. A measurement apparatus as recited in claim 5 wherein said communication indicia have visual characteristics which vary regularly with the volume of traffic on said network in a manner prescribed by the user of said measurement apparatus.

7. A measurement apparatus as recited in claim 6 wherein said scatter graph has a first node axis having a plurality of indicia and a second node axis having a plurality of indicia, and wherein activity on said network is indicated on said scatter graph by communication indicia.

8. A measurement apparatus as recited in claim 7 wherein said communication indicia has visual characteristics which vary regularly with the volume of traffic on said network in a manner prescribed by the user of said measurement apparatus.

9. A method for producing a communications measurement n-X n matrix display for a packet-switched network, said network having a plurality of nodes, said nodes hosting devices, wherein said devices communicate with each other via said network by means of packets of information, said packets having source node fields and destination node fields, said method comprising the steps of:

(a) trapping the source and fields of packets transmitted on said network;

(b) coding the source field and destination field of each packet trapped;
(c) producing an output for each packet trapped, said output containing the coded source field and coded destination field of the packet;
(d) storing said output in short-term memory;
(e) moving the contents of said short-term memory to an update section of memory;
(f) producing a snap-shot of said update memory by copying said update memory into a snap-shot section of memory;
(g) accummulating said snap-shots in an accummulation section of memory over a predetermined interval of time;
(h) displaying the contents of said accummulation memory on an n-×-n display screen matrix; and
(i) continuously performing steps (a) through (h).

10. A packet-switched network traffic measurement apparatus, said packet-switched network having a plurality of nodes, said nodes hosting devices, wherein said devices communicate with each other via said network by means of transmission and reception of packets of information, said packets having source node fields and destination node fields, said measurement apparatus comprising:

trap means coupled to said packet-switched network for trapping packets transmitted on said network; and measurement means coupled to said trap means and operative to produce network traffic measurement information, wherein said measurement information includes source data regarding the source on the network of network traffic, destination data regarding the destination on the network of network traffic, and volume data regarding the magnitude of said network traffic.

* * * * *

UNITED STATES PATENT AND TRADEMARK OFFICE
CERTIFICATE OF CORRECTION

PATENT NO.  : 4,775,973

DATED       : October 4, 1988

INVENTOR(S) : Jeffrey Tomberlin, Justin S. Morrill, Jr., James P. Quan

It is certified that error appears in the above-identified patent and that said Letters Patent is hereby corrected as shown below:

On the title page:
Abstr., line 15, "nodes" should read -- node --;

Abstr., line 29, "usng" should read -- using --;

Abstr., line 29, (this section is missing) should read -- The hardware consists of a... --;

Column 4, line 27, "analyzser" should read -- analyzer --;

Column 5, line 65, "busier" should read -- is busier --;

Column 6, line 11, "connectiion" should read -- connection --;

Column 8, line 53, "signifcant" should read -- significant --;

Column 12, line 67, "fields" should read -- destination fields --.

Signed and Sealed this

Twenty-third Day of April, 1991

Attest:

HARRY F. MANBECK, JR.

*Attesting Officer*　　　　　*Commissioner of Patents and Trademarks*